United States Patent
Fujiwara et al.

(10) Patent No.: US 6,999,125 B2
(45) Date of Patent: Feb. 14, 2006

(54) IMAGE PICKUP APPARATUS

(75) Inventors: Akihiro Fujiwara, Tochigi (JP); Tomohiro Harada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 693 days.

(21) Appl. No.: 09/946,322

(22) Filed: Sep. 5, 2001

(65) Prior Publication Data

US 2002/0057338 A1   May 16, 2002

(30) Foreign Application Priority Data

Sep. 11, 2000   (JP) .............................. 2000-275329

(51) Int. Cl.
   H04N 5/235   (2006.01)
   H04N 5/238   (2006.01)

(52) U.S. Cl. ...................................... 348/362; 348/363
(58) Field of Classification Search .............. 348/363, 348/362, 47, 49, 57, 56, 55, 54; 359/462; 396/324

See application file for complete search history.

(56) References Cited

U.S. PATENT DOCUMENTS

| | | | |
|---|---|---|---|
| 4,668,991 A * | 5/1987 | Theuwissen et al. ........ 348/349 |
| 5,649,897 A * | 7/1997 | Nakamura et al. ............ 348/45 |
| 6,762,794 B1 * | 7/2004 | Ogino ........................ 348/262 |
| 2001/0004298 A1 * | 6/2001 | Kobayashi .................. 359/462 |
| 2001/0019450 A1 * | 9/2001 | Ogino ........................ 359/462 |
| 2002/0057338 A1 * | 5/2002 | Fujiwara et al. .............. 348/49 |

FOREIGN PATENT DOCUMENTS

| | | |
|---|---|---|
| DE | 42 43 566 A1 | 6/1994 |
| EP | 0 921 694 A2 | 6/1999 |

* cited by examiner

Primary Examiner—Aung Moe
(74) Attorney, Agent, or Firm—Cowan, Liebowitz & Latman, P.C.

(57) ABSTRACT

An image pickup apparatus comprising: right and left optical systems; shutters disposed in correspondence with each of the right and left optical systems, for time-divisionally switching between incident light; a micro computer for controlling an open/close timing of the shutters; and an image pickup element for picking up an image input via the right and left optical systems, wherein the microcomputer variably controls the open/close timing of the shutters in accordance with exposure timing information of the image pickup element.

26 Claims, 11 Drawing Sheets

FIG. 8A
Vsync

FIG. 8B
CS

FIG. 8C
CCD
ACCUMULATION
TIME

FIG. 8D
SHUTTER
OPEN/CLOSE
SIGNAL

FIG. 8E
SHUTTER
OPEN/CLOSE
SIGNAL

FIG. 8F
ODD/EVEN
SIGNAL

IMAGE PICKUP APPARATUS

BACKGROUND OF THE INVENTION

1. Field of the Invention

The present invention relates to an image pickup apparatus of a field sequential record type for picking up a stereo image with right and left parallaxes.

2. Related Background Art

A stereo image pickup system will be described.

The stereo image pickup system described herein is of a field time-division type in which odd and even fields of an interlace video method such as NTSC are allocated to an image seen from a right eye (left eye) and an image seen from a left eye (right eye).

Images picked up and recorded by the field time-division method are reproduced on a CRT monitor or the like, and viewed by using a pair of liquid crystal shutter spectacles which open and close synchronously with image timings. In this manner, a stereo image of the picked-up image can be viewed.

Figure 9:
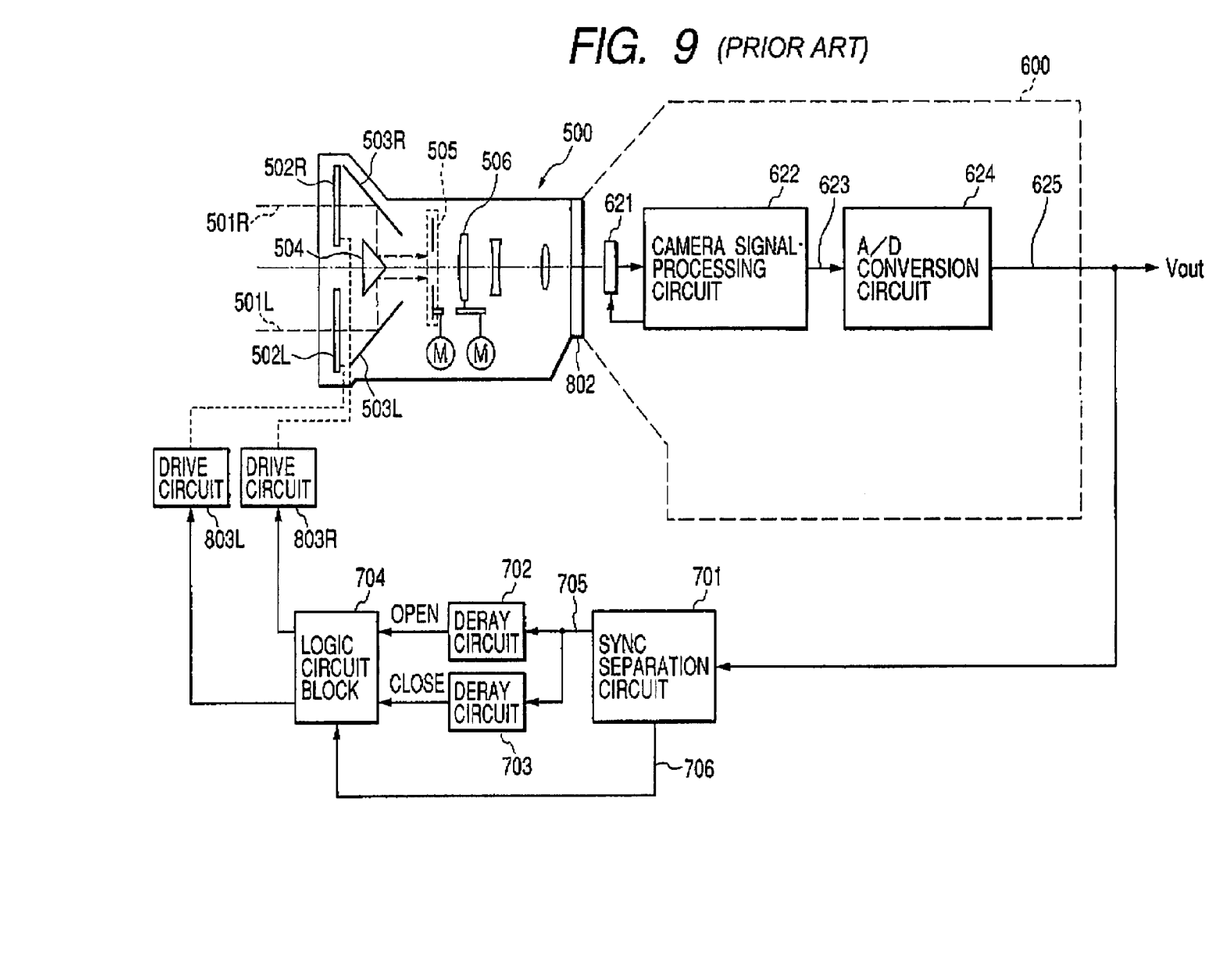
FIG. 9 is a diagram showing the structure of a conventional system.

FIG. 9 is a diagram showing the structure of a video camera to which the invention is applied. Referring to FIG. 9, reference numeral 500 represents a lens unit (optical system unit) for generating right and left parallaxes, this optical system being separated into right and left optical systems on the side of the objective lens. A liquid crystal shutter (for right eye) 502R and a liquid crystal shutter (for left eye) 502L disposed respectively in the right and left optical systems are operated so as to transmit a light flux (for right eye) 501R and a light flux (for left eye) 501L, respectively.

Transmitted light fluxes are converged into one light flux by a mirror (for right eye) 503R, a mirror (for left eye) 503L and a prism 504. The converged light flux passes through an iris 505 and through a lens exchange mount 802 via an optical system 506 constituted of lenses and the like, and is focussed on an image pickup plane of a CCD (image pickup element) 621 on the side of a camera unit 600. Only one of the right and left fluxes reaches the image pickup plane at certain timing.

An image signal (video signal) output from the image pickup element 621 is processed by a camera signal processing circuit 622 and supplied to an A/D converter circuit 624 via a signal line 623 to be converted into a digital signal in conformity with specifications such as NTSC and output to the external via a signal line 625.

This signal is displayed by a display system (not shown) compatible with a stereo image so that stereo images can be viewed.

A flow of signals for opening and closing the liquid crystal shutters will be described.

An image signal input to a sync separation circuit 701 via the signal line 625 is separated into a vertical sync signal Vsync and an odd/even judgement signal (ODD/EVEN signal).

The vertical sync signal Vsync is input to two delay circuits 702 and 703 via a signal line 705 to generate two different delay pulse signals. An output of the delay circuit 702 is used as a trigger signal for opening the shutter, and an output of the delay circuit 703 is used as a trigger signal for closing the shutter. The ODD/EVEN signal is supplied to a signal line 706.

In accordance with the two trigger signals and the ODD/EVEN signal supplied via the signal line 706, a logic circuit block 704 generates two pulse signals for driving the liquid crystal shutters 502R and 502L to open and close the shutters via a drive circuit (for right eye) 803R and a drive circuit (for left eye) 803L.

The delay circuits 702 and 703 are each constituted of a mono multi-vibrator circuit.

Figure 11:
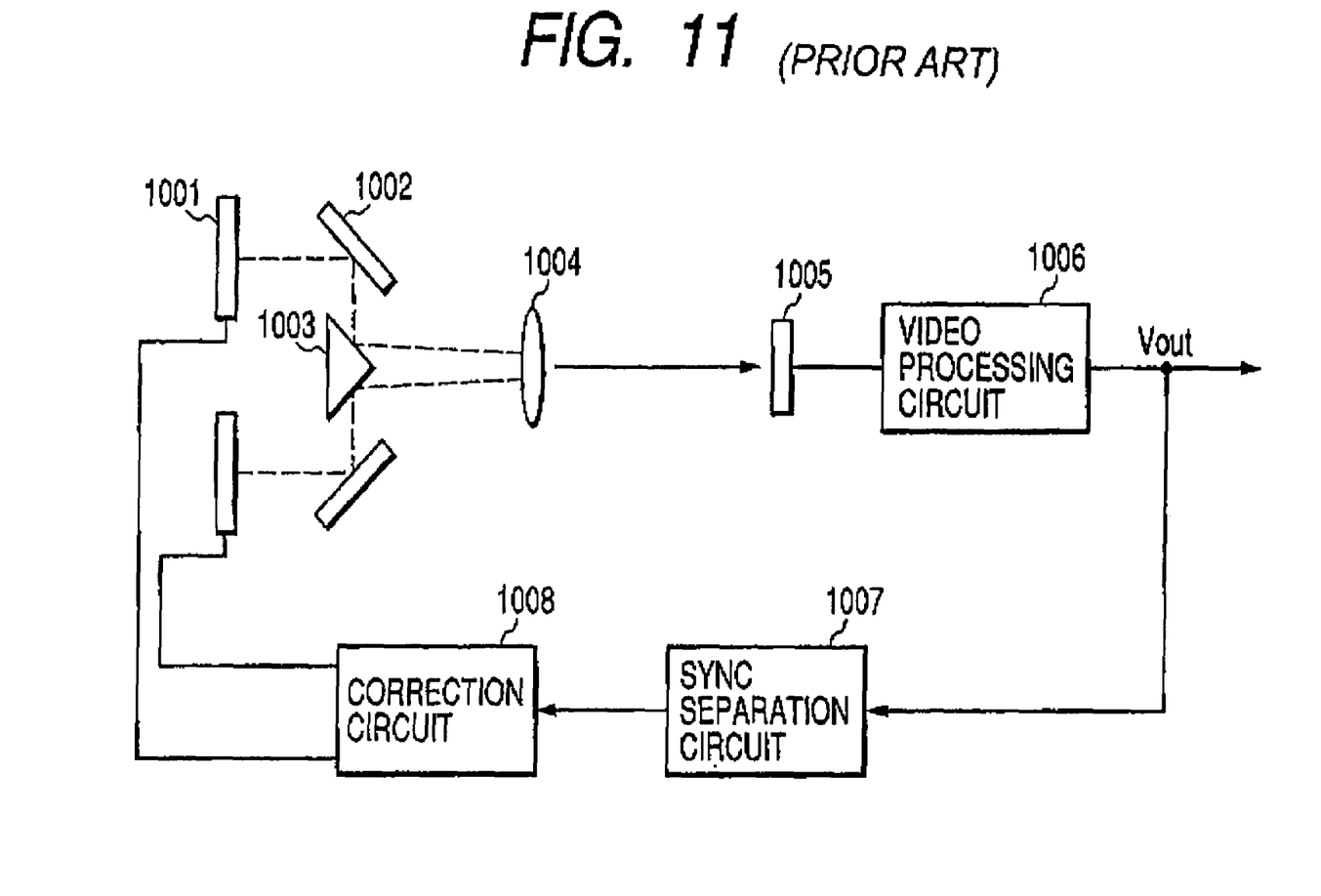
FIG. 11 is a diagram showing the structure of another conventional system.

FIG. 11 is a diagram showing the structure of a conventional video camera simplifying the structure shown in FIG. 9. In FIG. 11, reference numeral 1001 represents right and left shutters (right eye shutter 1001R and left eye shutter 1001L) which are opened and closed at proper timings to time-divisionally receive a stereo image. Reference numeral 1002 represents right and left mirrors (right eye mirror 1002R and left eye mirror 1002L) which adjust the directions of right and left optical axes. Reference numeral 1003 represents a prism for the division of right and left optical axes.

Reference numeral 1004 represents a lens for inputting an image. Reference numeral 1005 represents a CCD for receiving a stereo image from the lens 1004. Reference numeral 1006 represents a video processing circuit which processes a signal supplied from CCD 1005 to generate a video signal Vout.

Reference numeral 1007 represents a sync separation circuit which generates a vertical sync signal (and an ODD/EVEN signal). Reference numeral 1008 represents a correction circuit which corrects drive signals by using a delay amount preset based upon an accumulation time of CCD 1005.

The corrected signals are used as drive signals of the shutters so that a stereo image without crosstalk can be input.

In the stereo image pickup system described above, the shutters for switching between right and left images are driven by right and left inverted shutter drive signals which are generated in accordance with a sync signal separated from an input image signal.

There is a difference between the sync signal and the accumulation timing of CCD. If the shutters are driven directly by drive signals not corrected, crosswalk occurs between the right and left images. From this reason, the shutter open/close timing is corrected based upon the accumulation timing of CCD.

The structure described above is, however, associated with the following problems.

The open/close timing of the liquid crystal shutter 502 shown in FIG. 9 is fixed based upon the sync signal derived from the image signal (fixed by settings of the delay circuits 702 and 703).

Figure 10:
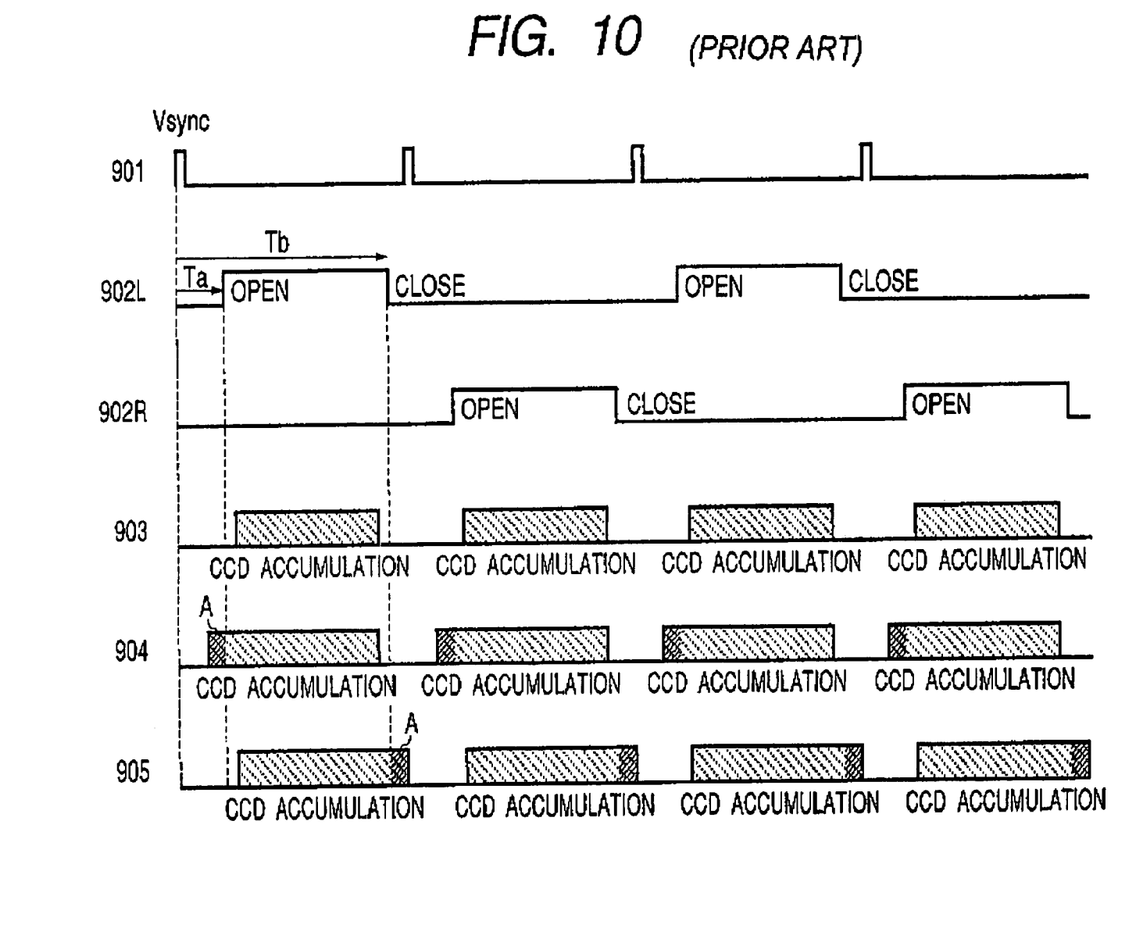
FIG. 10 is a timing chart showing each signal waveform of the system shown in FIG. 9.

This relation is illustrated in FIG. 10 which is a timing chart of each signal waveform in FIG. 9. Referring to FIG. 10, reference numeral 901 represents the waveform of the vertical sync signal Vsync derived from an image signal. In accordance with this vertical sync signal, the liquid crystal shutter drive signal is generated.

Reference numeral 903 represents the waveform showing the accumulation timing of CCD which is fixed to a predetermined relation to the vertical sync signal Vsync.

Reference numeral 902 represents the waveform showing the open/close timing of the liquid crystal shutter. The sufficient conditions for the shutter open period are that this period includes the CCD accumulation timing indicated by the waveform 903, and the necessary conditions for the shutter open period are that this period does not overlap another CCD accumulation timing preceding or following the subject CCD accumulation period (right eye period for left, and left eye period for right).

If the former sufficient conditions are not satisfied, the exposure amount of an image may become insufficient, whereas if the latter necessary conditions are not satisfied, a crosswalk may occur between right and left images and the quality of a stereo image is degraded. In the conventional example, the relation between the vertical sync signal and the CCD accumulation timing is fixed. Therefore, the timing when the liquid crystal shutter is opened (after an elapse of a time Ta from the leading edge of the vertical sync signal Vsync) and the timing when the liquid crystal shutter is closed (after an elapse of a time Tb from the leading edge of the vertical sync signal Vsync) are fixed by the settings of the two delay circuits 702 and 703 shown in FIG. 9.

A lens exchange system is used on the assumption that a new lens unit and a new camera unit will be developed in the future. A newly developed camera unit does not necessarily use the same image pickup element such as a CCD, the same driver circuit and the like.

Namely, there is a possibility that the CCD accumulation time is altered.

Depending upon the specification of a high speed shutter and the like, the accumulation time may dynamically change.

In such a case, there is a mismatch (shift) between the accumulation time and the fixed open/close timing of the liquid crystal shutters so that a light amount lowers or crosstalk occurs.

Waveforms 904 and 905 shown in FIG. 10 show difference between the timings of the liquid crystal shutters and the CCD accumulataion timing when CCD accumulation times are changed. In FIG. 10, areas A indicated by solid oblique lines correspond to insufficient light amounts which result in a degraded image quality. If the difference becomes larger, the accumulation time overlaps the accumulation time for the other liquid crystal shutter, which results in crosstalk.

In correcting the difference caused by the lens unit, it is necessary to set again the correction circuit 1008 shown in FIG. 11.

SUMMARY OF THE INVENTION

The present invention has been made to solve the above-described problems. It is an object of the invention to provide an image pickup system, a lens unit and an image pickup apparatus capable of preventing a lowered light amount and crosstalk which may be caused by difference between the accumulation time of an image pickup element and the open/close timing of the shutter.

In order to achieve the above object, according to a preferred embodiment of the invention, there is disclosed an image pickup system having a lens unit and a camera unit and picking up a stereo image with right and left parallaxes by a field sequential record method, wherein the lens unit comprises: right and left optical systems arranged to pick up a stereo image with right and left parallaxes and; shielding means disposed in each of the right and left optical systems, for time-divisionally switching between incident light beams; control means for controlling an open/close timing of the shielding means; and communication means for communicating with the camera unit, and wherein the control means controls the open/close timing of the shielding means in accordance with exposure timing information of the camera unit included in information received from the camera unit via the communication means.

Other objects and features of the invention will become apparent from the following detailed description of embodiments when read in conjunction with the accompanying drawings.

DESCRIPTION OF THE PREFERRED EMBODIMENTS

Figure 1:
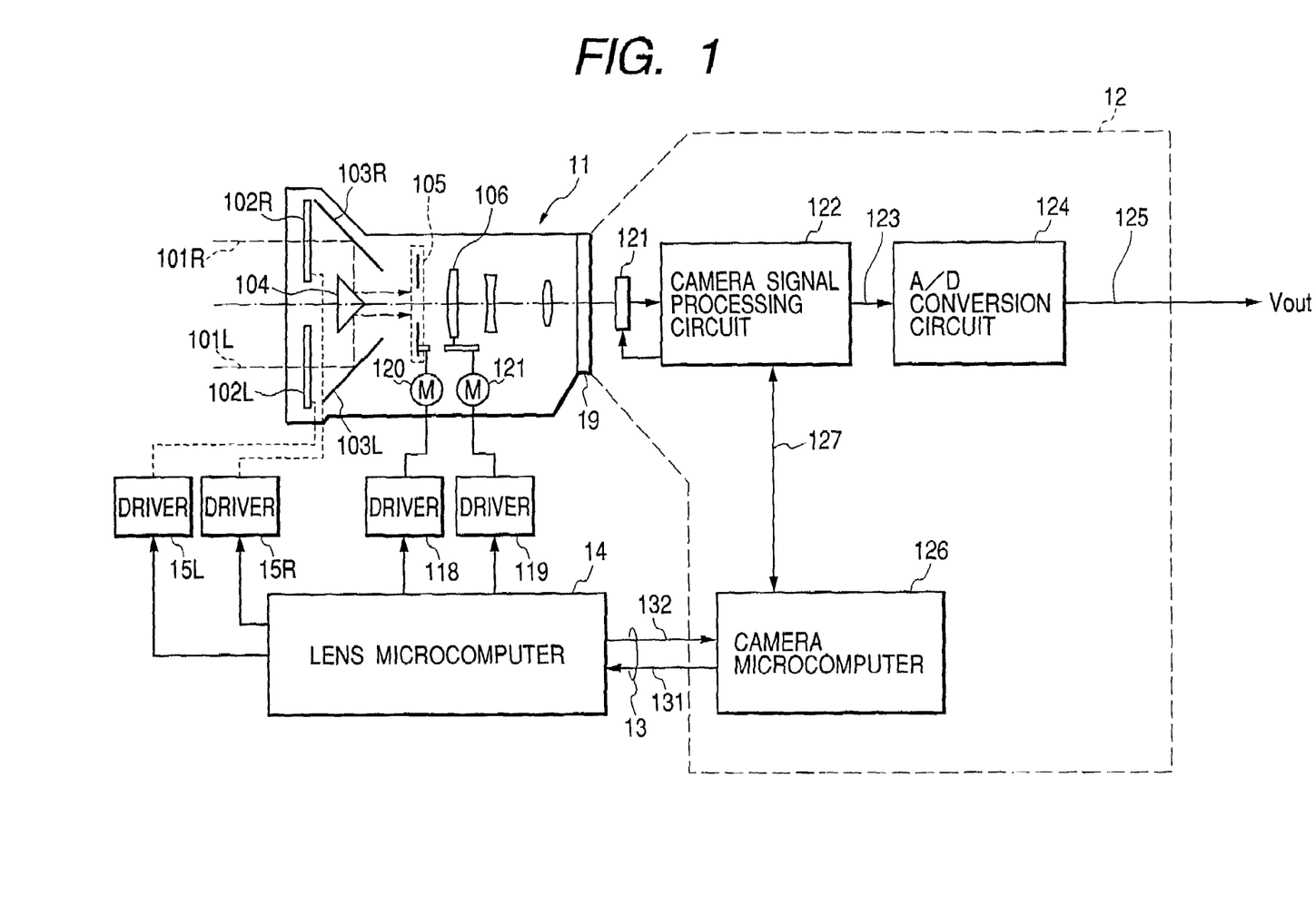
FIG. 1 is a diagram showing the structure of a first embodiment.

FIG. 1 is a diagram showing the structure of a stereo image pickup system according to a first embodiment. In FIG. 1, reference numeral 11 represents a lens unit for generating right and left parallaxes, this lens unit being separated into right and left optical systems on the side of the objective lens. A liquid crystal shutter (for right eye) 102R and a liquid crystal shutter (for left eye) 102L disposed in the right and left optical systems are operated so as to transmit a light flux (for right eye) 101R and a light flux (for left eye) 101L, respectively.

Transmitted light fluxes are converged into one light flux by a mirror (for right eye) 103R, a mirror (for left eye) 103L and a prism 104. The converged light flux passes through an iris 105 and through a lens exchange mount 19 via an optical system 106 constituted of lenses and the like, and is focussed on an image pickup plane of a CCD (image pickup element) 121 on the side of a camera unit 12. Only one of the right and left fluxes reaches the image pickup plane at certain timing.

An image signal (video signal) output from the image pickup element 121 is processed by a camera signal processing circuit 122 and supplied to an A/D converter circuit 124 via a signal line 123 to be converted into a digital signal in conformity with specifications such as NTSC and output to the external via a signal line 125.

In the following, the characteristic parts of the embodiment will be described.

A camera microcomputer 126 controls the camera signal processing circuit 122 and communicates with a lens microcomputer (control means, correction means, reception means) 14 via communication lines (communication means, transmission means) 13 to thereby periodically exchange information necessary for lens control. This communication is disclosed in JP-A-10-65952 and the details thereof is omitted. It is to be noted, however, that this communication is performed synchronously with the vertical sync signal.

The camera microcomputer 126 also sets the accumulation period (time) of CCD 121 and thus has the information of CCD 121 in order to control the camera signal processing circuit 122.

In this embodiment, it is judged how much the start and end time of the accumulation period are different from the communication timing, i.e., the vertical sync signal.

The camera microcomputer 126 controls the communication timing synchronously with the vertical sync signal, and also controls various parameters such as an image pickup mode and a shutter speed.

The camera microcomputer 126 can correctly acquire the timings of the accumulation period of the image pickup element and the vertical sync signal. In accordance with the acquired timings, the camera microcomputer 126 generates control information by calculating the open/close timing of the liquid crystal shutters in such a manner that the accumulation period of the image pickup element is correctly positioned within the open period of the liquid crystal shutter 102L, 102R of the lens unit 11.

Figure 2:
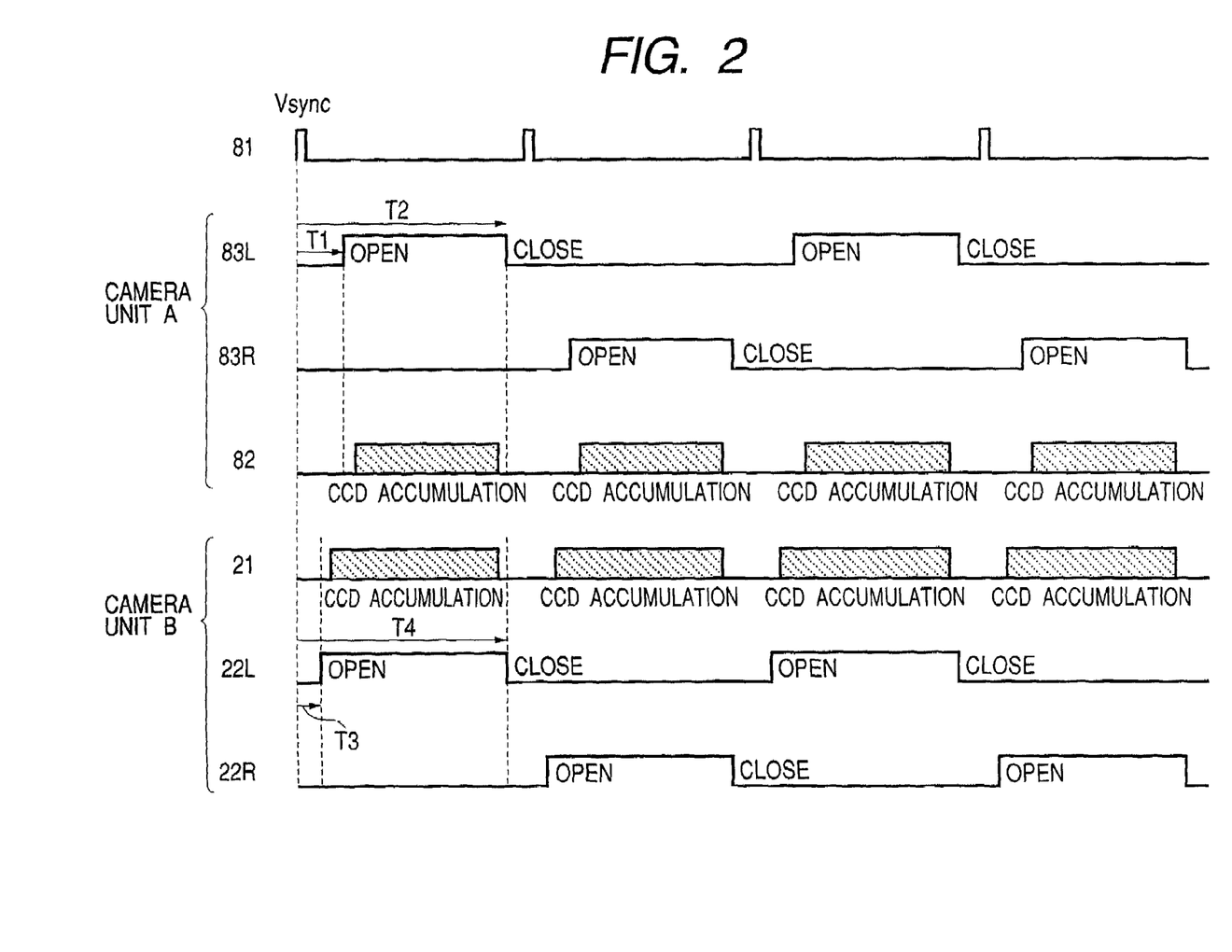
FIG. 2 is a timing chart showing each signal waveform of the first embodiment.

The control information for open/close control of the liquid crystal shutters 102L and 102R is represented as a difference time from the vertical sync signal, and is sequentially transmitted to the lens microcomputer 14 as digital information T1 and T2. In this example, as shown in FIG. 2, the digital information T1 corresponds to a time T1 from when the vertical sync signal rises to when the shutter is opened, and the digital information T2 corresponds to a time T2 from when the vertical sync signal rises to when the shutter is closed.

The camera microcomputer 126 transmits the above-described time information together with a signal (ODD/EVEN signal) representative of whether the currently picked-up field is an even field or an odd field, to the lens microcomputer 14.

Next, the operation flow on the lens side will be described.

The lens microcomputer 14 executes the following processes in accordance with two sets of time information (T1 and T2) sequentially received from the camera microcomputer 126. These processes will be described with reference to the flow chart of FIG. 3.

Figure 3:
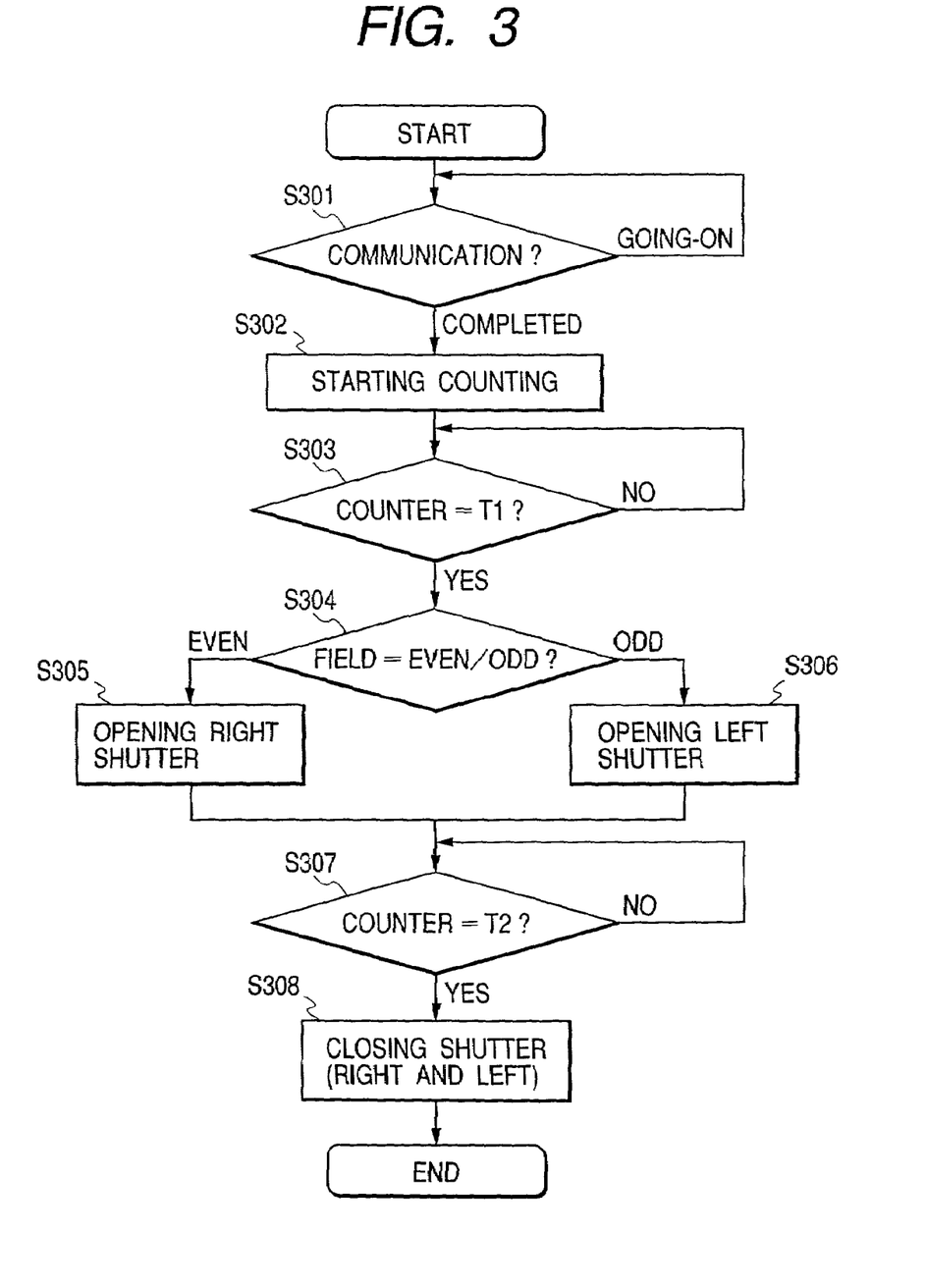
FIG. 3 is a flow chart illustrating the operation of the first embodiment.

FIG. 3 is the flow chart illustrating the operation of the first embodiment. The operation is performed under the control of a CPU (not shown) which executes a program stored in a ROM (not shown).

First, it is judged whether communication operation is going on or completed (Step S301), and at the same time when the communication is completed, a counter (not shown) starts counting (Step S302). The counter is reset at each vertical sync signal. In the case of NTSC, a counter counts up about 250 times during a period of the vertical sync signal.

When the count becomes equal to T1 (Step S303), it is judged whether the field is even or odd (Step S304). If the field is even, a signal for opening the shutter 102R is generated (Step S305), whereas if the field is odd, a signal for opening the shutter 102L is generated (Step S306).

Thereafter, when the count becomes equal to T2 (Step S307), a process of closing each shutter is executed (Step S308).

FIG. 2 is the timing chart showing each signal waveform of the first embodiment, and illustrates how the timing of each signal changes.

In this example, two types of camera units A and B are selectively used, and it is explained how each shutter is driven in such the case.

The camera unit A has an accumulation time of CCD indicated by a waveform 82 shown in FIG. 2. As indicated by waveforms 83L and 83R, a count of 50 is set to T1 and a count of 230 is set to T2. It is assumed that the counter counts up 250 times during a period of the vertical sync signal.

The camera unit B having performances different from the camera unit A has an accumulation time of CCD indicated by the waveform 21. T3 (time from when the vertical sync signal rises to when the shutter is opened) of a waveform 22R is 20, and T4 (time from when the vertical sync signal rises to when the shutter is closed) of a waveform 22L is 230.

The camera side transmits the timing of the vertical sync signal Vsync as well as the shutter open/close timing information T1 and T2 provided by considering the accumulation time of CCD based upon the vertical sync signal Vsync, to the lens side. It is therefore possible for the lens microcomputer 14 to properly open and close the shutter by taking the accumulation time into consideration.

As described above, according to the stereo image pickup system of a lens-exchange type of the first embodiment, a proper liquid crystal shutter open/close timing can be set for any combination of the lens unit and camera unit. Accordingly, a lowered exposure amount (lowered light amount) and crosstalk which may be caused by the shift of a shutter open/close timing can be avoided, so that a stereo image having a good image quality can be picked up always.

Figure 4:
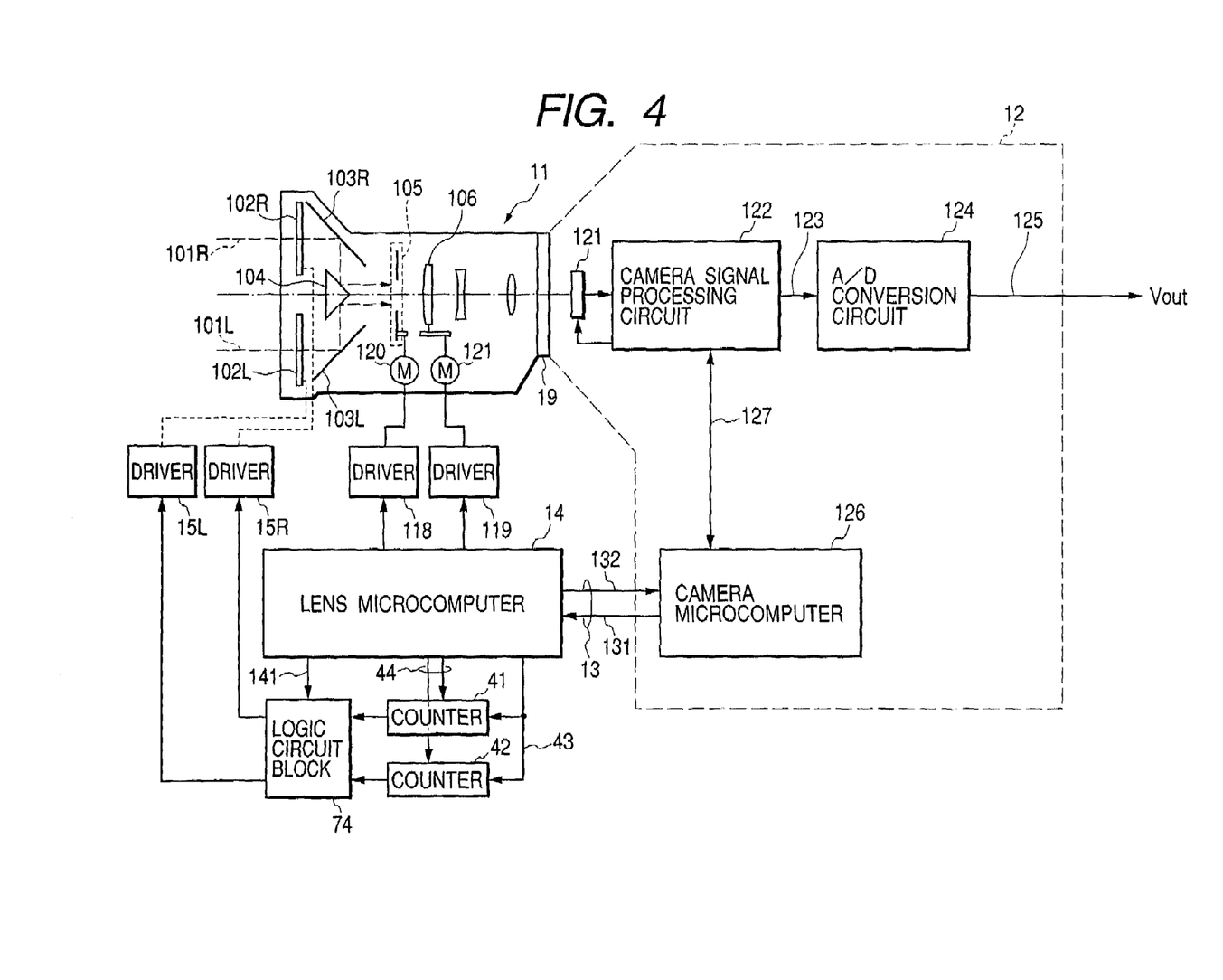
FIG. 4 is a diagram showing the structure of a second embodiment.

FIG. 4 is a diagram showing the structure of a stereo image pickup system according to a second embodiment of the present invention. In the first embodiment, software of the lens microcomputer 14 is used for realizing timing control, whereas in the second embodiment, hardware is used for realizing timing control. The description of similar elements to those shown in FIG. 1 is omitted, and only a driver circuit portion for liquid crystal shutters will be described.

In FIG. 4, reference numeral 43 represents a signal line for outputting a trigger signal from the lens microcomputer 14. This trigger signal is used as a count start signal for programmable counters 41 and 42 to start counting.

Reference numeral 44 represents signal lines via which counts are written into the programmable counters 41 and 42 in advance. Via these write signal lines, counts corresponding to the time T1 from when the vertical sync signal rises to when the shutter opens and to the time T2 from when the vertical sync signal rises to when the shutter closes, respectively obtained at the above-described communication, are written before the count start.

Pulse signals corresponding to the open/close timings of the liquid crystal shutter 102 and output from the counters 41 and 42 are supplied to a logic circuit block 74.

Reference numeral 141 represents an odd/even judgement signal for distinguishing between an odd field and an even field. This signal is generated in accordance with information acquired by the lens microcomputer 14 from the camera unit 12 at each communication operation. In accordance with the pulses corresponding to shutter open/close timings supplied from the counters 41 and 42 and the odd/even judgement signal (ODD/EVEN signal), the logic circuit block 74 supplies shutter open/close signals to drivers 15L and 15R.

With this structure of the embodiment, the program counters 41 and 42 can set as desired the time from when the vertical sync signal rise to when the shutter open and the time from when the vertical sync signal rise to when the shutter close, although these times are fixed in the conventional system.

In the first and second embodiments, in accordance with the CCD accumulation period of the camera unit, the open/close timing of the liquid crystal shutter of the lens unit is changed. Specifically, by using the communication means between the lens unit and camera unit of a lens-exchange system, the information of the CCD accumulation period or the information of the liquid crystal shutter open/close timing set in accordance with the CCD accumulation period is transmitted from the camera unit to the lens unit. In accordance with the information, the lens unit controls the open/close timing of the liquid crystal shutter. Accordingly, a lowered exposure amount (lowered light amount) and crosstalk which may be caused by the shift of a shutter open/close timing can be avoided, so that a stereo image having a good quality can always be picked up.

Figure 5:
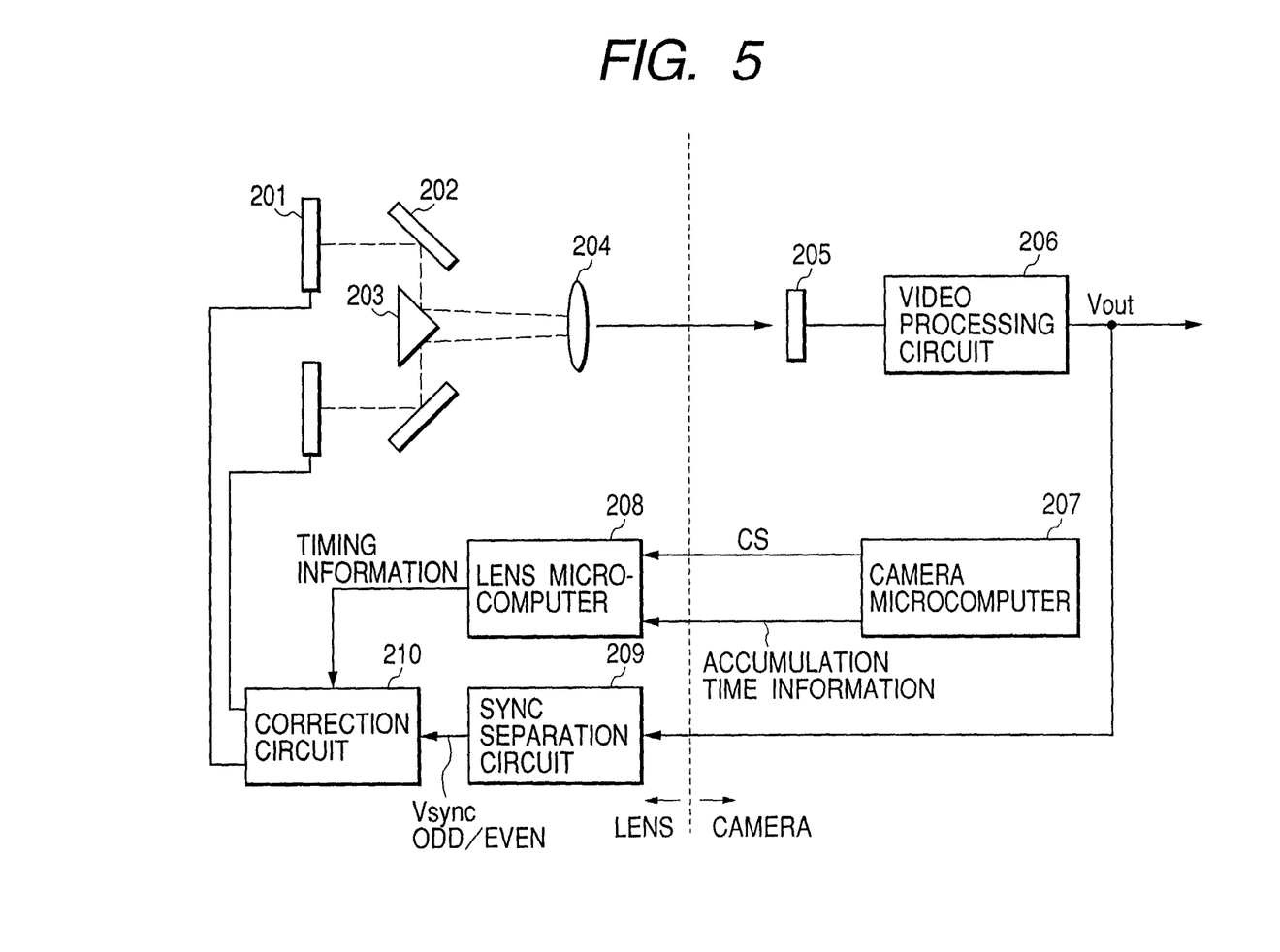
FIG. 5 is a diagram showing the structure of a third embodiment.

FIG. 5 is a diagram showing the structure of a stereo image pickup system according to a third embodiment of the present invention. In FIG. 5, reference numeral 201 represents right and left shutters (shutter 201R for right eye and shutter 201L for left eye) for inputting a time-divisional stereo image by repeating the open/close operation between the right and left shutters at a proper cycle. Reference numeral 202 represents right and left mirrors (mirror 202R for right eye and mirror 202L for left eye) for adjusting the direction (convergence angle) of right and left optical axes. Reference numeral 203 represents a prism for separating into right and left optical axes.

Reference numeral 204 represents a lens for converging an image. Reference numeral 205 represents an image pickup element such as a CCD for picking up a stereo image. Reference numeral 206 represents a video processing circuit which processes a signal supplied from CCD 205 to generate an image signal Vout.

Reference numeral 207 represents a camera microcomputer for controlling the camera (camera unity) and transmitting delay information of an accumulation time of CCD 205 to the lens unit. Reference numeral 208 represents a lens microcomputer for controlling the lens unity and outputting timing information for correcting a drive timing of the shutters 201 based upon delay information of the accumulation time.

Reference numeral 209 represents a sync separation circuit for deriving a vertical sync signal (and an ODD/EVEN signal for distinguishing between an odd field and an even field). Reference numeral 210 represents a correction circuit which outputs shutter drive signals suitable for the accumulation time in accordance with the vertical sync signal and the timing information.

In picking up a stereo image, if the shutter 201 is driven by using the vertical sync signal, there is caused a difference between the accumulation time of CCD 205 and the shutter open/close timing by a shift of the accumulation time, and this results in crosstalk between right and left images occurs.

CCD 205 receives light at its photosensitive plane and accumulates it to convert it into electric signal, to thereby outputting a video signal. In this case, CCD 205 accumulates light for each frame and the start timing of accumulation has some delay from the vertical sync signal (this delay is decided by the format of the camera unit).

Since the shutter drive signal is generated based upon the vertical sync signal, it has a delay corresponding to the accumulation delay. A circuit for correcting this shift or delay is provided to reduce crosstalk between right and left images.

In the lens-exchange system, the same combination of a camera (camera unity) and a lens (lens unity) is not always used. A correction amount for the shift of the accumulation time is required to be altered each time a different camera (camera unity) is used. In order to decide the correction amount, accumulation time information is added to the communication format used between the camera and lens so that the shutter can be driven in a manner always suitable for the accumulation time, even for any combination of the camera and lens.

Images having right and left parallaxes, input via the mirrors 202 and prism 203, are input to CCD 205 and then processed by the video processing circuit 206 which outputs an image signal (video signal). The shutters 201 disposed on the right and left optical axes are alternately opened and closed. Therefore, a stereo image of field-sequential right and left images can be formed.

At the same time when the camera microcomputer 207 performs various controls of the camera (camera unity), the camera microcomputer 207 communicates with the lens (lens unity) synchronously with a chip select signal CS (which is a sync signal for communication). The accumulation time information of CCD 205 is transmitted to the lens (lens unity) side.

In the lens unit, the sync separation circuit 209 derives the vertical sync signal Vsync and an ODD/EVEN signal whose level is inverted between High and Low in response to Vsync, from the supplied video signal (image signal) Vout. The lens microcomputer 208 generates the timing information representative of how much the drive timing of the shutter 201 is shifted, in accordance with the accumulation time information supplied from the camera side over communications. The lens microcomputer 208 supplies the generated timing information to the correction circuit 210. In driving the shutter 201, it is necessary to make the shutter transparent at least after the accumulation end time of CCD 205 in case of that the closed lens is opened, and to make the shutter not transparent at least before the accumulation start time in case of that the opened shutter is closed.

The timing information for correcting the shutter drive signal is generated so as to satisfy the above-described conditions. The correction circuit 210 corrects or shifts the shutter drive signal relative to the vertical sync signal in accordance with the timing information to drive the shutter without any crosstalk.

As above, according to the third embodiment, information of the accumulation time of CCD is transmitted from the camera side to the lens side, and the lens side decides the shutter drive timing in accordance with the received information. A shutter drive always suitable for the accumulation time can be realized independently from the type of CCD of the camera.

Figure 6:
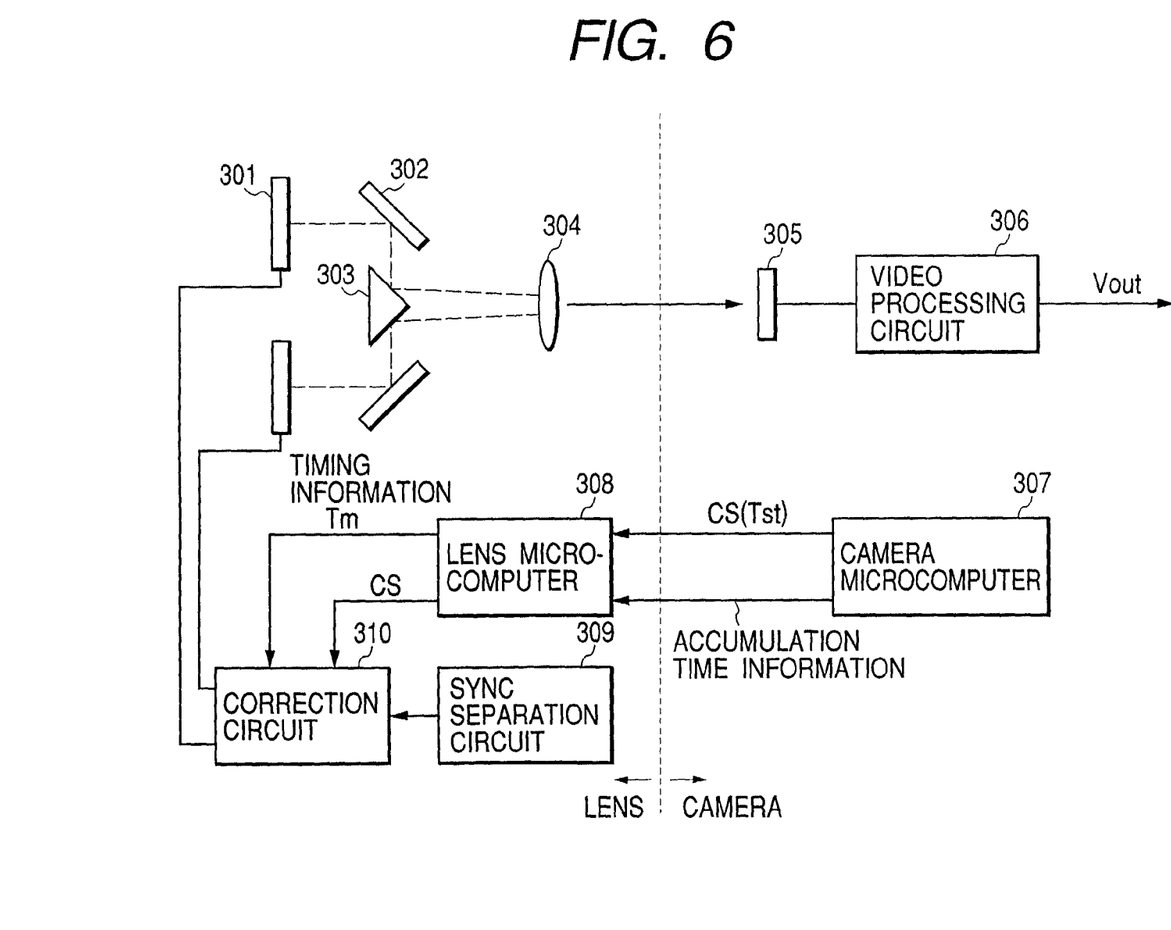
FIG. 6 is a diagram showing the structure of a fourth embodiment.

FIG. 6 is a diagram showing the structure of a stereo image pickup system according to a fourth embodiment of the present invention. In FIG. 6, reference numeral 301 represents right and left shutters (shutter 301R for right eye and shutter 301L for left eye) for inputting a time-divisional stereo image by repeating the open/close operation between the right and left shutters at a proper cycle. Reference numeral 302 represents right and left mirrors (mirror 302R for right eye and mirror 302L for left eye) for adjusting the direction of right and left optical axes. Reference numeral 303 represents a prism for separating into right and left optical axes.

Reference numeral 304 represents a lens for converging an image. Reference numeral 305 represents a CCD for picking up a stereo image from the lens 304. Reference numeral 306 represents a video processing circuit which processes a signal supplied from CCD 305 to generate an image signal (video signal) Vout.

Reference numeral 307 represents a camera microcomputer for controlling the camera (camera unity) and transmitting delay information of an accumulation time of CCD 305 to the lens unit. Reference numeral 308 represents a lens microcomputer for controlling the lens unit and outputting timing information for correcting a drive timing of the shutters 301 based upon the accumulation time delay information.

Reference numeral 309 represents a sync separation circuit for deriving a vertical sync signal (and an ODD/EVEN signal). Reference numeral 310 represents a correction circuit which outputs shutter drive signals suitable for the accumulation time in accordance with the vertical sync signal and the timing information.

In the third embodiment, the shutter drive signal is generated by using the vertical sync signal separated from the image signal (video signal) Vout supplied from the camera (camera unity) side.

However, in this case, it is necessary to connect a video output terminal of the camera (camera unity) side via a cable or the like to the lens (lens unity) side. This cable connection is not so good in terms of outer ornaments of a lens-exchange system.

In this embodiment, therefore, the video signal (image signal) is not used for deriving the vertical sync signal, but a sync signal obtained over communications via the mount between the camera and lens is used in place of the vertical sync signal.

Images having right and left parallaxes, input via the mirrors 302 and prism 303, are input to CCD 305 and then processed by the video processing circuit 306 which outputs a video signal. The shutters 301 disposed on the right and left optical axes are alternately opened and closed. Therefore, a stereo image of field sequential right and left images can be formed.

At the same time when the camera microcomputer 307 performs various controls of the camera (camera unity), the camera microcomputer 307 communicates with the lens unit synchronously with a chip select signal CS. The accumulation time information of CCD 305 is transmitted to the lens (lens unit) side.

Figure 8A:
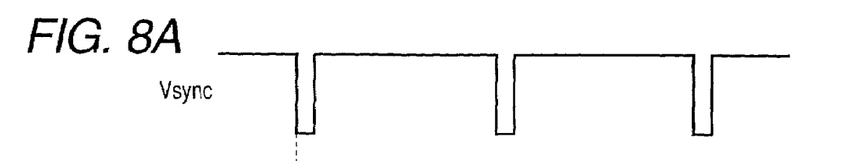
FIGS. 8A, 8B, 8C, 8D, 8E and 8F are timing charts showing each signal waveform of the third to fifth embodiments shown in FIGS. 5 to 7.
Figure 8B:
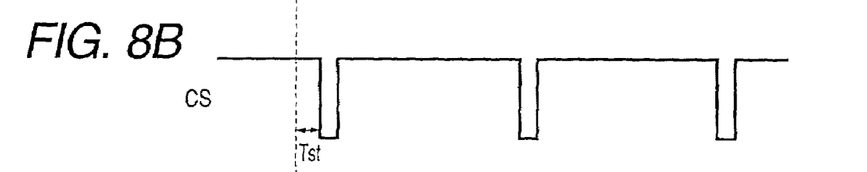

This CS signal is used for synchronization of communications between the camera and lens. The communications are performed every 1/60 second. The CS signal is delayed by a constant time Tst from the vertical sync signal Vsync as shown in FIG. 8B.

Since the delay time Tst is also transmitted when the CS signal is transmitted, the lens side can deal with this CS signal as an equivalent of the vertical sync signal Vsync. By using the accumulation time information together with the CS signal, the shutter drive timing (shutter drive signal) can be corrected to match the accumulation time.

Specifically, in the lens unit, the lens microcomputer 308 generates the timing information Tm representative of how much the drive timing of the shutter 301 is shifted, in accordance with the accumulation time information supplied from the camera side over communications. This timing information Tm is supplied to the correction circuit 310.

In driving the shutter 301, it is necessary to make the shutter not transparent at least before the accumulation time in case of that the opened shutter is closed. The timing information for correcting the shutter drive signal is generated so as to satisfy the this condition.

The correction circuit 310 corrects the shutter drive signal relative to the sync signal (CS signal) in accordance with the timing information supplied from the lens microcomputer 308 to drive the shutter without any crosstalk.

Figure 7:
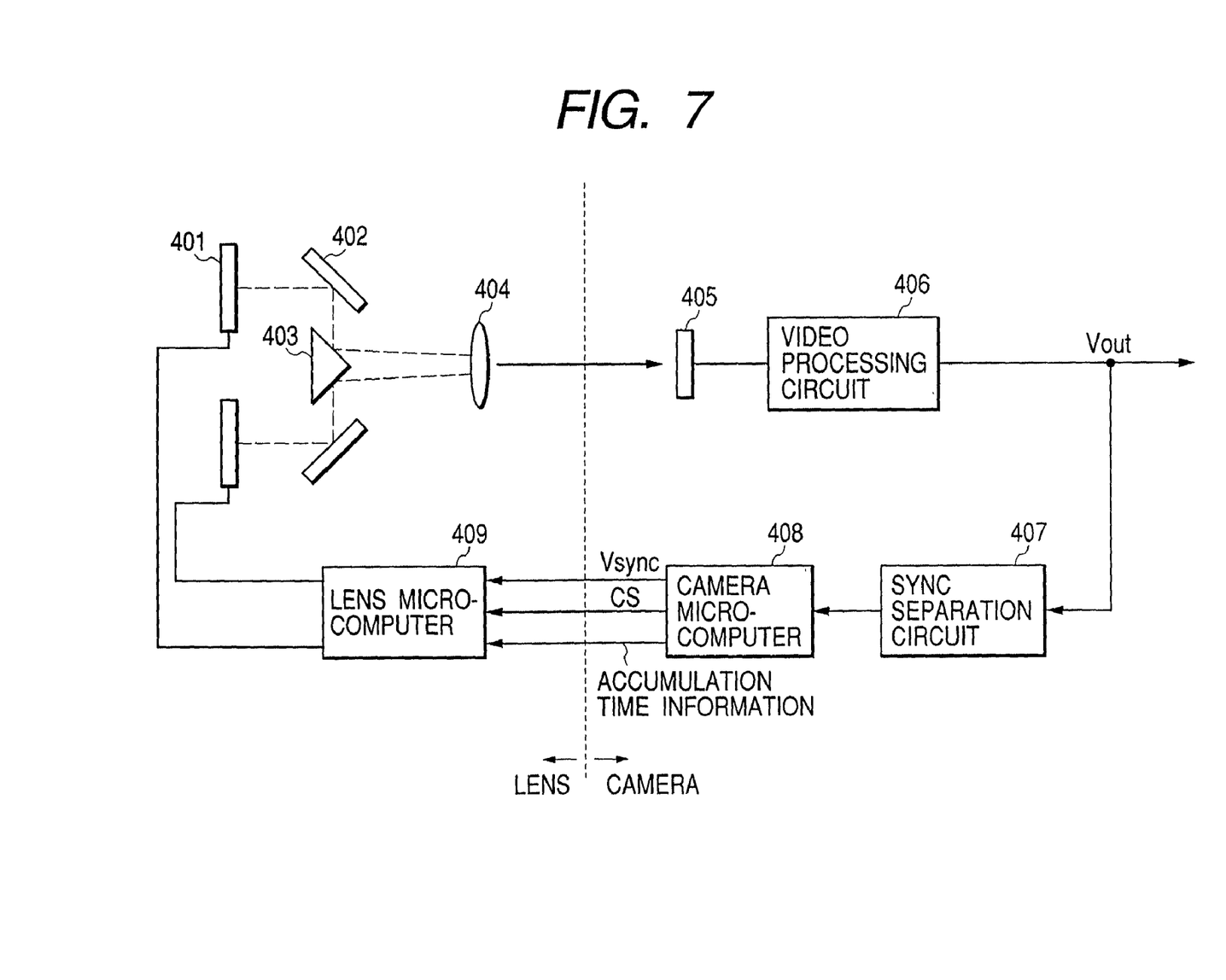
FIG. 7 is a diagram showing the structure of a fifth embodiment.

FIG. 7 is a diagram showing the structure of a stereo image pickup system according to a fifth embodiment of the present invention. In FIG. 7, reference numeral 401 represents right and left shutters (shutter 401R for right eye and shutter 401L for left eye) for inputting a time-divisional stereo image by repeating the open/close operation between the right and left shutters at a proper cycle. Reference numeral 402 represents right and left mirrors (mirror 402R for right eye and mirror 402L for left eye) for adjusting the direction of right and left optical axes. Reference numeral 403 represents a prism for separating into right and left optical axes.

Reference numeral 404 represents a lens for converging an image. Reference numeral 405 represents a CCD for picking up a stereo image from the lens 404. Reference numeral 406 represents a video processing circuit which processes a signal supplied from CCD 405 to generate an image signal (video signal) Vout.

Reference numeral 407 represents a sync separation circuit for extracting a vertical sync signal Vsync (and an ODD/EVEN signal) from the video signal (image signal).

Reference numeral 408 represents a camera microcomputer for controlling the camera (camera unit) and transmitting delay information of an accumulation time of CCD 405 to the lens unit. Reference numeral 409 represents a lens microcomputer for controlling the lens unit and outputting a proper shutter drive signal in accordance with the vertical sync signal and accumulation time delay information.

The shutter drive signal for switching between the right and left shutters 401 to record a field sequential stereo image is generated by using a sync signal. The easiest method of generating the shutter drive signal is to derive the vertical sync signal from the video signal and use this vertical sync signal.

By using the ODD/EVEN signal whose level is inverted between High and Low in response to the vertical sync signal Vsync and its inverted signal, the right and left shutters can be driven synchronously. In the conventional system, a video signal is used only in the camera unit, and the lens unit for driving the shutter cannot use that video signal.

In this embodiment, therefore, the sync separation circuit 407 is added to the camera unit. The vertical sync signal is derived on the camera unit side and added to the communication format to be used between the camera and lens. On the lens side, a proper shutter drive signal is generated.

Images having right and left parallaxes, input via the mirrors 402 and prism 403, are input to CCD 405 and then processed by the video processing circuit 406 which outputs a video signal. The shutters 401 disposed on the right and left optical axes are alternately opened and closed. Therefore, a stereo image of field-sequential right and left images can be formed.

At the same time when the camera microcomputer 408 performs various controls of the camera (camera unity), the camera microcomputer 408 communicates with the lens unity synchronously with a chip select signal CS.

The information for this communication includes the vertical sync signal Vsync output from the sync separation circuit 407 and the accumulation time information representative of how much the accumulation time of CCD 405 is delayed from the vertical sync signal Vsync.

In the lens unit, the lens microcomputer 409 generates a shutter drive signal in accordance with the received vertical sync signal and the accumulation time delay information. For the shutter drive signal, it is necessary to make the shutter transparent at least after the accumulation time of CCD 405 in case of that the closed lens is opened, and to make the shutter not transparent at least before the accumulation time in case of that the opened shutter is closed. This signal drives the shutter 401 so that the shutters can be driven without any crosstalk between right and left images.

Figure 8C:
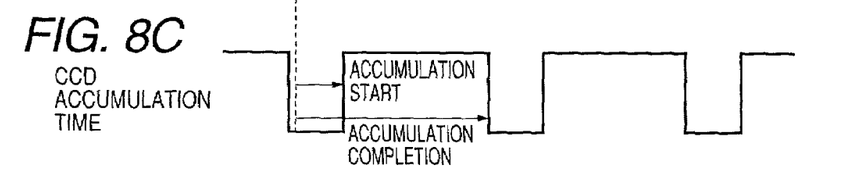
Figure 8D:
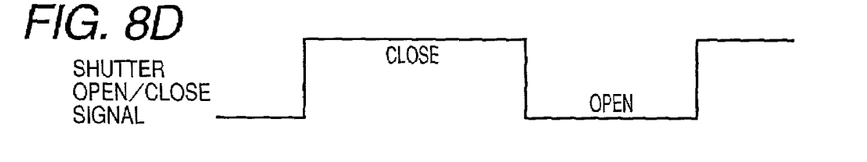
Figure 8E:
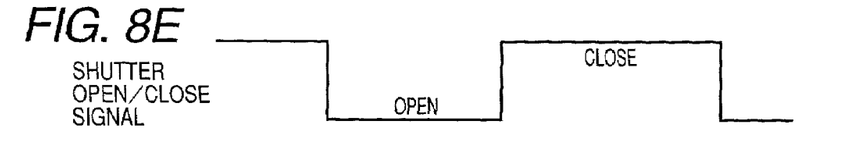
Figure 8F:
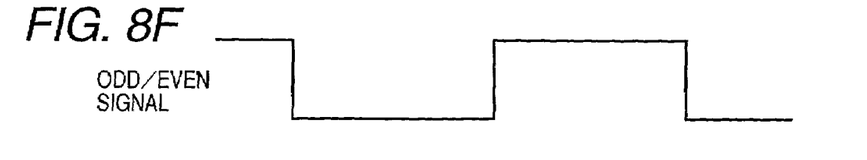

FIGS. 8A to 8F are timing charts illustrating each signal waveform of the embodiments shown in FIGS. 5 to 7. In FIGS. 8A to 8F, FIG. 8A shows the waveform of the vertical sync signal Vsync separated from the video signal, FIG. 8B shows the waveform of the chip select signal CS for communication synchronization between the camera and lens, FIG. 8C shows the waveform of a signal representative of the accumulation time of CCD, FIG. 8D shows the waveform of the shutter drive signal for the right eye corrected relative to the sync signal, FIG. 8E shows the waveform of the shutter drive signal for the left eye corrected relative to the sync signal, and FIG. 8F is the waveform of the ODD/EVEN signal relative to the vertical sync signal Vsync. As apparent from FIGS. 8A to 8F, the CCD accumulation time is controlled to be always within the shutter open time.

In the third to fifth embodiments, the CCD accumulation time information of the camera is added to the communication format between the camera and lens. It is therefore possible to reduce crosstalk between right and left images even for any combination of the camera and lens.

By adding the vertical sync signal to the communication format between the camera and lens, it becomes possible to generate the shutter drive signal without supplying the video signal externally from the lens side.

As described so far, according to the above-described embodiments, a lowered light amount and crosstalk which may be caused by a shift between the accumulation time of the image pickup element and the open/close timing of the shutter can be prevented.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    right and left optical systems;
    shielding means disposed correspondingly to each of said right and left optical systems, for time-divisionally switching between incident light;
    control means for controlling an open/close timing of said shielding means; and
    image pickup means for picking up an image input via said right and left optical systems,
    wherein said control means variably controls the open/close timing of said shielding means in accordance with exposure timing information of said image pickup means.

2. The image pickup apparatus according to claim 1, wherein the exposure timing information is information as to an accumulation time of said image pickup means.

3. The image pickup apparatus according to claim 2, wherein said control means controls said shielding means in accordance with the exposure timing information so that said shielding means is opened before a start of the accumulation time of said image pickup means and closed after an end of the accumulation time.

4. The image pickup apparatus according to claim 1, wherein said shielding means is a liquid crystal shutter disposed in each of said right and left optical systems.

5. The image pickup apparatus according to claim 1, wherein the exposure timing information is information representative of a time difference between a vertical sync signal in a video signal output from said image pickup means and the accumulation time of said image pickup means.

6. The image pickup apparatus according to claim 1, wherein said control means controls an open/close of said shielding means in accordance with the exposure timing information and an odd/even field identification signal.

7. The image pickup apparatus according to claim 1, wherein said right and left optical systems have a predetermined parallax and pick up images with right and left parallaxes by a field-sequential recording method to form a stereo image.

8. A lens unit capable of being removably mounted on a camera unit, comprising:
    a) right and left optical systems having right and left parallaxes and being capable of picking up a stereo image;
    b) shielding means disposed in each of said right and left optical systems, for time-divisionally switching between incident light;
    c) control means for controlling an open/close timing of said shielding means; and
    d) communication means for communicating with the camera unit,
    wherein said control means controls the open/close timing of said shielding means in accordance with accumulation timing information of image pickup means of the camera unit, received from the camera unit via said communication means,
    wherein the accumulation timing information is information representative of a time difference between a communication timing signal for said communication means and the accumulation time of said image pickup means.

9. The lens unit according to claim 8, wherein said control means controls said shielding means in accordance with the accumulation timing information so that said shielding means is opened before a start of the accumulation time of the image pickup means and closed after an end of the accumulation time.

10. The lens unit according to claim 8, wherein said shielding means is a liquid crystal shutter disposed in each of said right and left optical systems.

11. The lens unit according to claim 8, wherein said communication timing signal is synchronous with a generation period of an image of a video signal output from said image pickup means of said camera unit.

12. The lens unit according to claim 8, wherein said control means controls an open/close of said shielding means in accordance with the accumulation timing information and an odd/even field identification signal.

13. The lens unit according to claim 8, wherein said right and left optical systems have a predetermined parallax and pick up images with right and left parallaxes by a field-sequential recording method to form a stereo image.

14. A camera system including a camera unit and a lens unit capable of being removably mounted on the camera unit,
   wherein said camera unit comprises:
   a) image pickup means for picking up an image focused by said lens unit and outputting a video signal; and
   b) camera side control means for transmitting accumulation timing information of said image pickup means to said lens unit; and
   wherein said lens unit comprises:
   c) right and left optical systems having right and left parallaxes and being capable of picking up a stereo image;
   d) shielding means disposed in each of said right and left optical systems, for time-divisionally switching between incident light beams; and
   e) lens side control means for controlling an open/close timing of said shielding means in accordance with the accumulation timing information received from the camera unit,
   wherein the accumulation timing information is information representative of a time difference between a communication timing signal for communication means disposed between said camera side control means and said lens side control means and an accumulation time of said image pickup means.

15. The camera system according to claim 14, wherein the accumulation timing information is information as to an accumulation time of said image pickup means of said camera unit.

16. The camera system according to claim 14, wherein said control means controls said shielding means in accordance with the accumulation timing information so that said shielding means is opened before a start of the accumulation time of said image pickup means and closed after an end of the accumulation time.

17. The camera system according to claim 14, wherein said shielding means is a liquid crystal shutter disposed in each of said right and left optical systems.

18. The camera system according to claim 14, wherein said the communication timing signal is synchronous with a generation period of an image of a video signal output from said image pickup means of said camera unit.

19. The camera system according to claim 14, wherein said control means controls an open/close of said shielding means in accordance with the accumulation timing information and an odd/even field identification signal.

20. The camera system according to claim 14, wherein said right and left optical systems have a predetermined parallax and pick up images with right and left parallaxes by a field-sequential recording method to form a stereo image.

21. An image pickup control method comprising:
   a step of time-divisionally driving shielding means disposed correspondingly to each of right and left optical systems, to switch between incident light;
   a step of picking up an image input via said right and left optical systems with image pickup means; and
   a step of controlling an open/close timing of said shielding means in accordance with accumulation timing information of said image pickup means,
   wherein the accumulation timing information is information representative of a time difference between a vertical sync signal in a video signal output from said image pickup means and the accumulation time of said image pickup means.

22. The method according to claim 21, wherein the accumulation timing information is information as to an accumulation time of said image pickup means.

23. The method according to claim 22, wherein said controlling step includes a step of controlling the shielding means in accordance with the accumulation timing information so that said shielding means is opened before a start of said accumulation time of said image pickup means and closed after an end of the accumulation time.

24. The method according to claim 21, wherein said shielding means is a liquid crystal shutter disposed in each of said right and left optical systems.

25. The method according to claim 21, wherein said controlling step includes a step of controlling an open/close of said shielding means in accordance with the accumulation timing information and an odd/even field identification signal.

26. The method according to claim 21, wherein said right and left optical systems have a predetermined parallax and pick up images with right and left parallaxes by a field-sequential recording method to form a stereo image.

* * * * *

UNITED STATES PATENT AND TRADEMARK OFFICE
CERTIFICATE OF CORRECTION

PATENT NO. : 6,999,125 B2
APPLICATION NO. : 09/946322
DATED : February 14, 2006
INVENTOR(S) : Akihiro Fujiwara et al.

It is certified that error appears in the above-identified patent and that said Letters Patent is hereby corrected as shown below:

Column 12, line 4, delete "crystal shatter" and insert --crystal shutter--

Signed and Sealed this

Twenty-first Day of November, 2006

JON W. DUDAS
*Director of the United States Patent and Trademark Office*